US012328790B2

(12) United States Patent
Uhling et al.

(10) Patent No.: US 12,328,790 B2
(45) Date of Patent: Jun. 10, 2025

(54) LTE MODEM EDRX PAGING OPPORTUNITY MANAGEMENT

(71) Applicant: Itron, Inc., Liberty Lake, WA (US)

(72) Inventors: Thomas Uhling, Spokane Valley, WA (US); Keith Barnes, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 581 days.

(21) Appl. No.: 17/556,905

(22) Filed: Dec. 20, 2021

(65) Prior Publication Data

US 2022/0369281 A1    Nov. 17, 2022

Related U.S. Application Data

(60) Provisional application No. 63/188,562, filed on May 14, 2021.

(51) Int. Cl.
*H04W 76/28* (2018.01)
*H04W 68/02* (2009.01)
(Continued)

(52) U.S. Cl.
CPC .......... *H04W 76/28* (2018.02); *H04W 68/02* (2013.01); *H04W 72/12* (2013.01); *H04W 72/1263* (2013.01)

(58) Field of Classification Search
CPC . H04W 76/28; H04W 52/0216; H04W 52/02; H04W 76/27; H04W 24/10;
(Continued)

(56) References Cited

U.S. PATENT DOCUMENTS

2007/0109987 A1* 5/2007 Kohlmann ........ H04W 52/0225
370/320
2013/0201890 A1    8/2013 Swaminathan et al.
(Continued)

OTHER PUBLICATIONS

Manninen, "Design and Implementation of Energy Efficient Narrowband IoT Sensor Platform", May 7, 2020, Aalto University School of Engineering (Year: 2020).
(Continued)

*Primary Examiner* — Kwasi Karikari
(74) *Attorney, Agent, or Firm* — Lee & Hayes, P.C.

(57) ABSTRACT

Techniques for sharing resources between a radio access technology (RAT) modem (e.g., an LTE modem) and a processor-based radio (e.g., a software-defined radio) are described. In an example, operation of the RAT modem establishes an extended discontinuous reception mode (eDRX) cycle with a cellular system. The RAT modem sends eDRX scheduling information, that is based at least in part on the eDRX cycle, to the processor-based radio. Operation of the processor-based radio identifies paging opportunities (POs) of the eDRX cycle, based at least in part on the eDRX scheduling information. Operation of the processor-based radio manages usage of shared resources (e.g., transmit and receive amplifiers, digital signal processing elements, memory devices, elements of physical layer(s), and/or antenna(s), etc.). The managing may be based at least in part on the identified POs. The managing avoids conflicts between the RAT modem and the processor-based radio over the shared resources.

21 Claims, 8 Drawing Sheets

(51) Int. Cl.
*H04W 72/12* (2023.01)
*H04W 72/1263* (2023.01)

(58) Field of Classification Search
CPC . H04W 88/02; H04W 52/0212; H04W 88/06; H04W 92/18; H04W 76/38
See application file for complete search history.

(56) References Cited

U.S. PATENT DOCUMENTS

| | | | |
|---|---|---|---|
| 2013/0215809 A1* | 8/2013 | Chang | H04W 76/28 |
| | | | 370/311 |
| 2015/0036656 A1* | 2/2015 | McCarthy | H04B 7/0689 |
| | | | 370/331 |
| 2015/0050952 A1 | 2/2015 | Ponukumati | |
| 2015/0282057 A1 | 10/2015 | Li et al. | |
| 2016/0360564 A1* | 12/2016 | Liu | H04W 76/14 |
| 2017/0099649 A1* | 4/2017 | Vos | H04W 76/28 |
| 2019/0045577 A1* | 2/2019 | Kim | H04W 76/50 |
| 2019/0386763 A1 | 12/2019 | Rentschler | |
| 2021/0256833 A1 | 8/2021 | Daoura et al. | |
| 2022/0369416 A1 | 11/2022 | Uhling | |
| 2023/0308193 A1 | 9/2023 | Banin et al. | |
| 2023/0354266 A1 | 11/2023 | Xiang et al. | |
| 2024/0098694 A1 | 3/2024 | Xie et al. | |

OTHER PUBLICATIONS

Office Action for U.S. Appl. No. 17/556,918, Dated Jul. 5, 2024, 63 pages.

\* cited by examiner

Scheduling PO Events by Processor-Based Radio

LTE MODEM EDRX PAGING OPPORTUNITY MANAGEMENT

RELATED APPLICATIONS

This application claims priority to U.S. Provisional Patent Application No. 63/188,562, filed on 14 May 2021, titled "LTE Modem eDRx Paging Opportunity Management," the entirety of which is incorporated herein by reference.

BACKGROUND

When an extended discontinuous reception (eDRx) cycle has been established by a long-term evolution (LTE) modem it would be desirable to share resources with a processor-based radio and to coordinate the shared resource(s) between the two radio systems to avoid conflicts that might otherwise occur. It would be desirable to minimize the impact on the LIE modem with respect to ongoing eDRx cycles and to minimize the LTE modem's responsibilities to communicate detailed information to the processor-based radio each eDRx cycle.

Accordingly, a method to accomplish this desired outcome would be welcome by the industry. Additionally, a system or method of signaling between the two radio systems to coordinate shared resource usage would be welcome by the industry.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for coordination— e.g., in an extended discontinuous reception (eDRx) cycle that has been established by a long-term evolution (LTE) modem that is sharing resources with a processor-based radio—of shared resource(s) between the two radio systems to avoid conflicts that may otherwise occur. The disclosure additionally describes techniques to minimize the impact on the LTE modem with respect to ongoing eDRx cycles and the LTE modem's responsibilities to communicate detailed information to the processor-based radio each eDRx cycle to accomplish this requirement. And further, the disclosure describes eDRx paging opportunity management in an LTE modem.

The disclosure is applicable to radio access technology devices (RATs) generally. RATs include technologies such as, Wi-Fi, GSM, UMTS, Bluetooth, LTE, etc. Accordingly, an LTE modem is an example of an RAT device. Some examples in the disclosure illustrate particular principles using Long Term Evolution (LTE) device(s); however, the principles may be applied more generally to other RAT devices, existing and not yet developed. In an example, an RAT modem and a processor-based radio may be located in the same network node and share resources. In a more specific example, a long-term evolution (LTE) modem, having established an extended discontinuous reception (eDRx) cycle, may share resources with a processor-based radio.

The processor-based radio may be a microprocessor-based radio and/or may be a software-defined radio. The processor-based radio may include a general-purpose microprocessor, a microcontroller unit, and/or may contain application specific integrated circuit(s) (e.g., ASIC devices). Accordingly, "processor-based" is defined generally, and therefore includes one or more of processors, microprocessors, CPUs, controllers, microcontrollers, ASICs, and other devices, singly or in combination(s).

Example Device in a Network Environment

Figure 1:
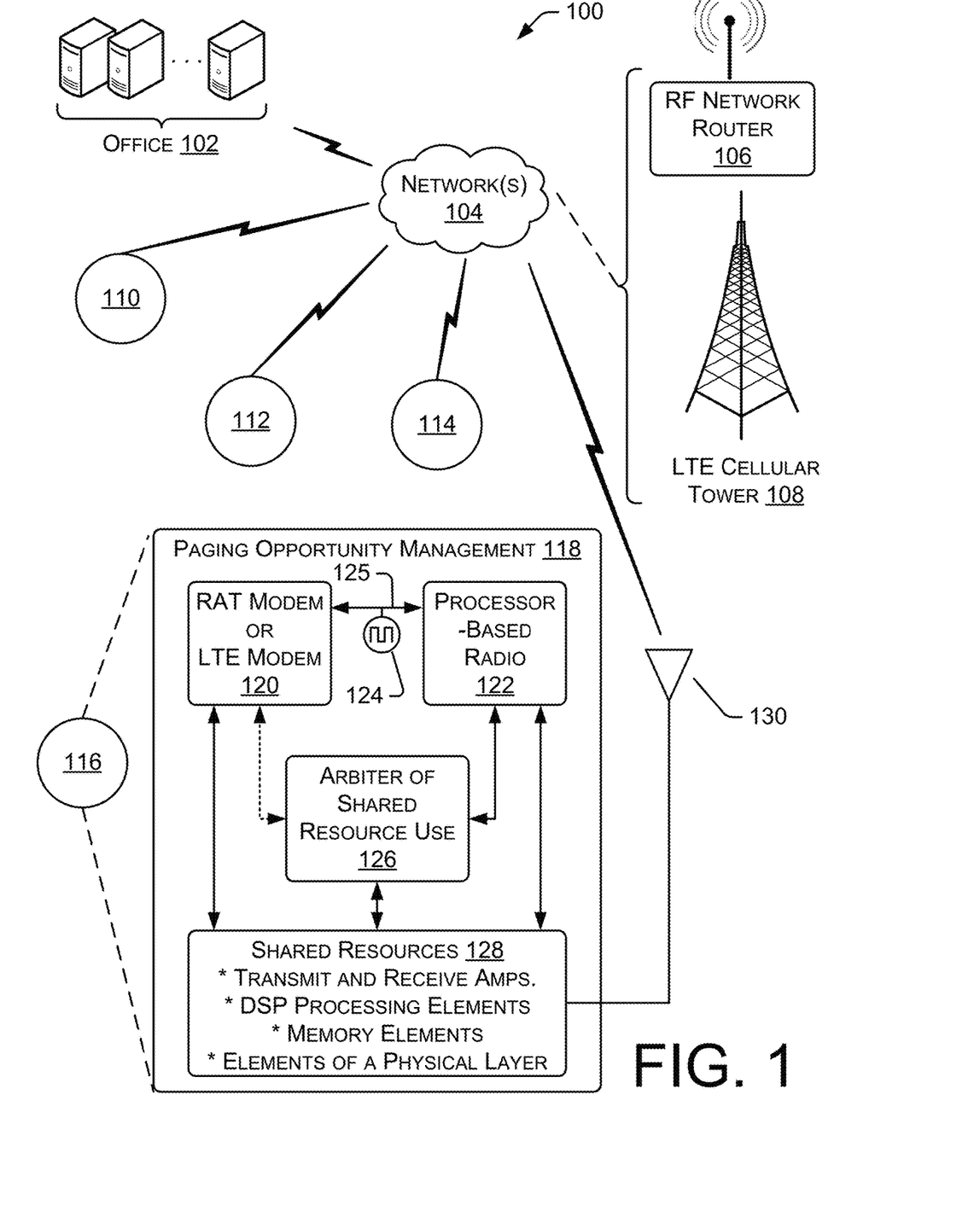
FIG. 1 is a block diagram of an example system illustrating a radio access technology (RAT) modem and/or LTE modem performing aspects of eDRX paging opportunity management.

FIG. 1 shows a system 100 that illustrates example operation of a multiple radio system, including an RAT (e.g., an LTE) modem and a processor-based radio (e.g., a microprocessor-based radio and/or a software-defined radio). In the example, an RAT modem (e.g., an LTE modem) and a processor-based radio perform aspects of eDRx paging opportunity management. The processor-based radio assumes some of the processing overhead and/or battery-power expenditure burden (that without the techniques described here would be expended by the RAT modem), and performs functions that share resources between the two radios without conflict.

The example system 100 shows a headend office 102 and a radio frequency (RF) network 104. The network 104 may represent one or more networks and associated technologies and/or may be a singular or compound network. In the example shown, a radio frequency (RF) network router 106 is representative of any RF network, such as the star or mesh networks established by utility companies, or other RF networks. The LTE cellular tower 108 is representative of any RAT technology, such as LTE cellular systems. In examples, both the RF network router 106 and/or the LTE cellular tower may be connected to the internet, and provide local and worldwide communications abilities. Accordingly, the network nodes or devices 110-116 are capable of communicating with the office computer systems 102 by operation of one or more networks, technologies, and/or carriers.

An example configuration of network device (node) 116 is shown. A combination of hardware devices (e.g., processors, memory devices, application specific integrated circuits (ASIC), etc.), and/or software may be used to provide paging opportunity management 118 and for the arbitration of use of shared resources.

In the example shown, the RAT modem 120 is configured to communicate with the LTE cellular tower 108 and the processor-based radio is configured to communicate with the RF network router 106. In an example, an RAT (e.g., LTE) modem 120 is in communication with a processor-based radio 122, such as by a communications link 125, which may be a data bus, wiring, etc. Communications from the RAT modem 120 may include general purpose input/output (GPIO) signals or messages 124. The processor-based radio 122 may be a software-defined radio, or other radio managed by, or including, a processor.

An arbiter of resource use 126 may be an application, algorithm, ASIC device, etc., which determines the radio, RAT modem 120 or the processor-based radio 122 that may utilize particular shared resources 128. While shown separately, the arbiter of resource use 126 may be part of the RAT modem or the processor-based radio. In the example shown, the processor-based radio 122 communicates with the arbiter 126, but in other examples an RAT modem 120 (if properly configured) may perform this function. In the example, the shared resources may include transmit and receive amplifiers, digital signal processing elements (e.g., hardware and/or software), memory elements, and/or elements of one or more physical layers. The antenna 130 may also be shared. While the antenna is shown as a singular device for illustrative convenience, the antenna 130 is representative of the multiple antennas used in many networked devices, such as cellular telephones.

eDRx Cycle Modem/Processor-Based Radio Interaction Overview

When an eDRx cycle has been established by an LTE modem that is sharing resources with a processor-based radio, arbitration and/or coordination of resources shared between the two radios prevent conflicts that would otherwise occur. Additionally, it is desirable to minimize the impact on the LTE modem with respect to ongoing eDRx cycles and its responsibilities to communicate detailed information to the processor-based radio each eDRx cycle to accomplish this requirement. This overview and the following detailed description provide a method to accomplish this desired outcome. It also provides a description of required general-purpose input/output (GPIO) signaling between the two systems that may be used to coordinate usage of shared resources.

The LTE modem negotiates an eDRx cycle with the cellular system once discovery has occurred and a cell has been selected. In some circumstances, the eDRx cycle may be adapted or changed if required by the LTE system for a cell re-selection, or a cell system update, or other circumstance(s). Once the cellular modem has established an agreed-to eDRx cycle with the LTE cellular system or updated parameters of the cycle it may inform the processor-based radio about the details of the cycle. This may be accomplished by sending the processor-based radio an eDRx scheduling indication (e.g., scheduling information) that includes the pertinent information needed by the processor-based radio to identify and avoid conflicting requests for use of the resources shared between the LTE modem and processor-based radio. Transmission of this information is required only when an eDRx cycle is established, changed during operation, or abandoned due to system synchronization loss.

The processor-based radio may be responsible for using the information received in the eDRx scheduling indication from the LTE modem to identify all upcoming page time window (PTW) and the associated paging opportunities (POs) within the eDRx cycle. Once identified, the processor-based radio may manage the usage of the shared resources to avoid conflicts between the LTE modem and the processor-based radio.

GPIO signals between the LTE modem and processor-based radio may be used to assist the processor-based radio in tracking the POs of the eDRx cycle and the usage of the shared resources. These signals include a PO trigger signal that is time-aligned with the leading edge of the PO subframe of the LTE system. This GPIO signal, PO Trigger GPIO, is controlled by the LTE modem and may have a fixed known offset from the leading edge of the PO subframe to allow the LTE modem time to identify the trigger point and control the GPIO signal line. In addition to the GPIO PO Trigger, a GPIO Antenna Active signal may be provided by the LTE modem to the processor-based radio. The GPIO Antenna Active signal may be active anytime the LTE modem requires use of the antenna port to receive or transmit signals.

eDRx Scheduling Indication Parameters

Once the LTE modem has established an agreed-to eDRx cycle with the LTE cellular system, it may inform the processor-based radio about the details of the cycle by issuing an eDRx scheduling indication to the processor-based radio and including some or all of the following information:

Duration of eDRx cycle
Time to 1st PO
Time between PO(s)
Number of POs per PTW
PO Information
PO Listen Duration
LIE Sys Sync Duration
PO Trigger Delay.

The "Duration of the eDRx cycle" is the time from the start of one eDRx cycle to the start of the next eDRx cycle.

The "Time to 1st PO" is the time delta between a timing reference GPIO signal to the expected leading edge of the 1st paging opportunity of the 1st PTW. The timing reference GPIO signal is established between the LTE modem and the processor-based radio each time the LTE modem boots to an active state where the communications link between the LTE modem and processor-based radio can be established.

The "Time between PO(s)" is dependent on the eDRx cycle and may be, for example, 1.28 seconds, 2.56 seconds, or other LTE eDRX cycle time-values.

The "Number of POs per PTW" indicates the number of PO(s) that will occur in each PTW.

The "PO Information" may include two subfields to describe the PO, e.g., the "PO Listen Duration" and the "LTE Sys Sync Duration" subfields. The "PO Listen Duration" is the time the LTE modem will require to listen for a page. This time may be centered around the PO subframe. The "LTE Sys Sync Duration" is time ahead of a page that can be used by the LTE modem to capture LTE system information such as time sync, MIB, SIB, etc. If the LTE modem does not require capturing LTE system information prior to a PO this value may be set to zero, as may be the case for the second and subsequent pages in a PTW. PO Information is included for each PO of the PTW. For example, if the PTW contains two POs then two "PO Information" fields and subfields will be included in the scheduling indication. Similarly, if 4 POs, then 4 "PO Information" fields and subfields will be included.

The "PO Trigger Delay" is a delay time from the leading edge of the PO subframe to a GPIO signal between the LTE modem and processor-based radio indicating the start of the PO subframe. The GPIO signal is used as a trigger to inform the processor-based radio when the leading edge of the LTE PO subframe occurred. This delay time represents the time it takes the LTE modem to identify the leading edge of the PO subframe and activate the trigger GPIO. In an example, the delay is consistent for each page in the PTW.

In the event the eDRx cycle is modified during operation, a new eDRx schedule indication may be sent to the processor-based radio informing the processor-based radio of the updates. The new eDRx schedule indication may use the same information parameters adjusted for the new changes to the cycle. For example, if the number of POs per PTW changes a new scheduling indication may be sent to the processor-based radio. All parameters, in this example, are kept the same except for the number of POs per PTW and potentially the time to the 1st PO of the next PTW which will depend on when the scheduling indication is sent to the processor-based radio.

Figure 2:
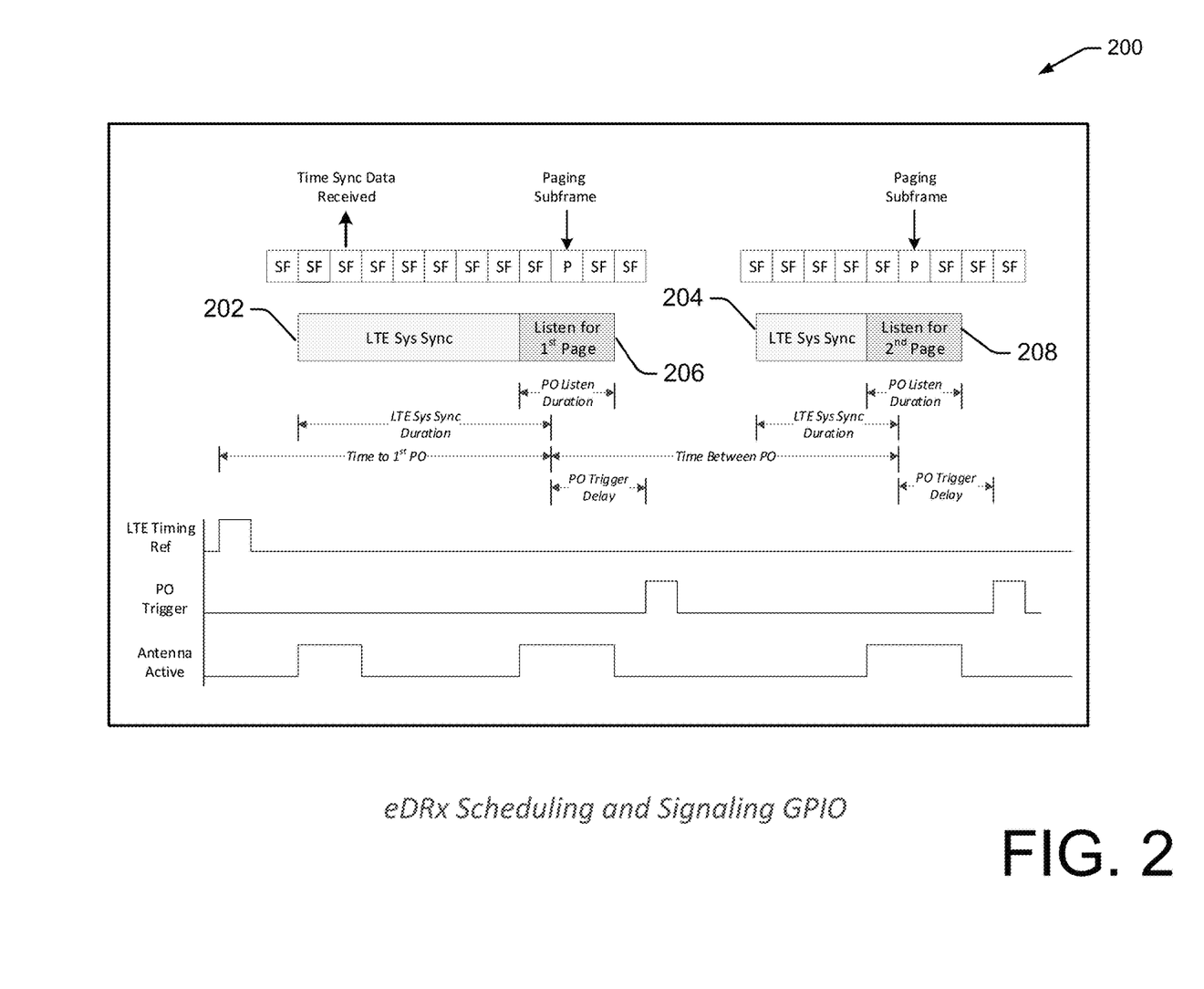
FIG. 2 is an example timing diagram showing extended discontinuous reception (eDRx) scheduling and general-purpose input/output (GPIO) signaling.

Discussion of FIG. 2

The PTW portion of the eDRx cycle is where the LTE modem listens for PO(s) from the LTE cellular system. A detailed view 200 of this portion of the cycle and the key timing elements that will be used to create an eDRx scheduling indication are shown in FIG. 2. In this example, the PTW only has two POs. The GPIO signals used for both the generation of the eDRx scheduling indication and ongoing coordination of the cycle by the processor-based radio are also shown.

The first row of elements in FIG. 2 represents the subframes of the LTE cellular system. Each small block is a subframe of 1 ms in duration. The subframes where a PO exists are identified by an arrow and a "P" in the subframe block.

The second row of elements in FIG. 2 illustrates windows 202, 204 where the LTE modem will capture LTE system information prior to a given page, and windows 206, 208 for listening for the actual page from the LTE system. The duration of windows 202-208 is identified by the timing arrows just below. The LTE sys sync duration begins at a predetermined time ahead of the PO subframe and ends at the leading edge of the PO subframe. The listening window for a PO begins ahead of the PO subframe and ends after the subframe. This window is centered around the PO. In an example, it is the responsibility of the LTE modem to identify the time it will need to perform any system sync processes and PO listening windows and correctly communicate that information to the processor-based radio when it sends the eDRx scheduling indication to the processor-based radio after establishing or receiving updates to the eDRx cycle. This information is communicated for each PO in the PTW allowing the LTE modem to define different LTE sys sync durations and PO listen durations for each PO in the PTW.

The timing arrow labeled "Time to 1st PO" represents the time from the LTE Timing Ref GPIO line going active to the estimated leading edge of the PO subframe. The LTE Active Ref GPIO signal is a control signal generated and transmitted by the LTE modem. A pulse is generated when the LTE modem is booted into an active state to establish a time reference for communicating event information to the processor-based radio. The LTE modem may create a timestamp based on the leading edge of the pulse and create timing information for event communication relevant to that edge. The processor-based radio likewise may create a timestamp with its clock at the same time based on the leading edge of the pulse. The processor-based radio can then calculate when an event will occur using the timing duration information sent to it by the LTE modem and its reference of the LTE Timing Ref GPIO signal. FIG. 2 shows this pulse being generated in close proximity to the start of a PTW, however in practice it may have occurred long before this PTW began when the LTE modem booted and first established the eDRx cycle.

The timing arrow labeled "Time Between PO" is the time from the start of one PO to the start of a subsequent PO in the same PTW. If only one PO exists in the PTW this value may be set to zero.

To assist the processor-based radio, the LTE modem supplies GPIO signaling to indicate to the processor-based radio precision real time timing information. The Antenna GPIO is used when the shared resources between the two modems are being used by the LTE modem. It is the responsibility of the LTE modem to control this signal and activate it prior to the use of the shared resources and de-activate it once they are no longer in use. The processor-based radio will use this information to identify the exact time an event actually starts and finishes. The LTE modem may also control a PO Trigger GPIO. This GPIO provides a triggering signal to the processor-based radio that will indicate when the leading edge of the PO subframe occurs. The timing arrow labeled PO Trigger Delay is a delay time from the leading edge of the PO subframe to the edge of the PO Trigger GPIO pulse shown in FIG. 2. In an example, this delay is consistent for each PO in each PTW of the eDRx cycle. It is communicated to the processor-based radio as part of the eDRx scheduling indication.

Processor-Based Radio eDRx Event Management

Figure 3:
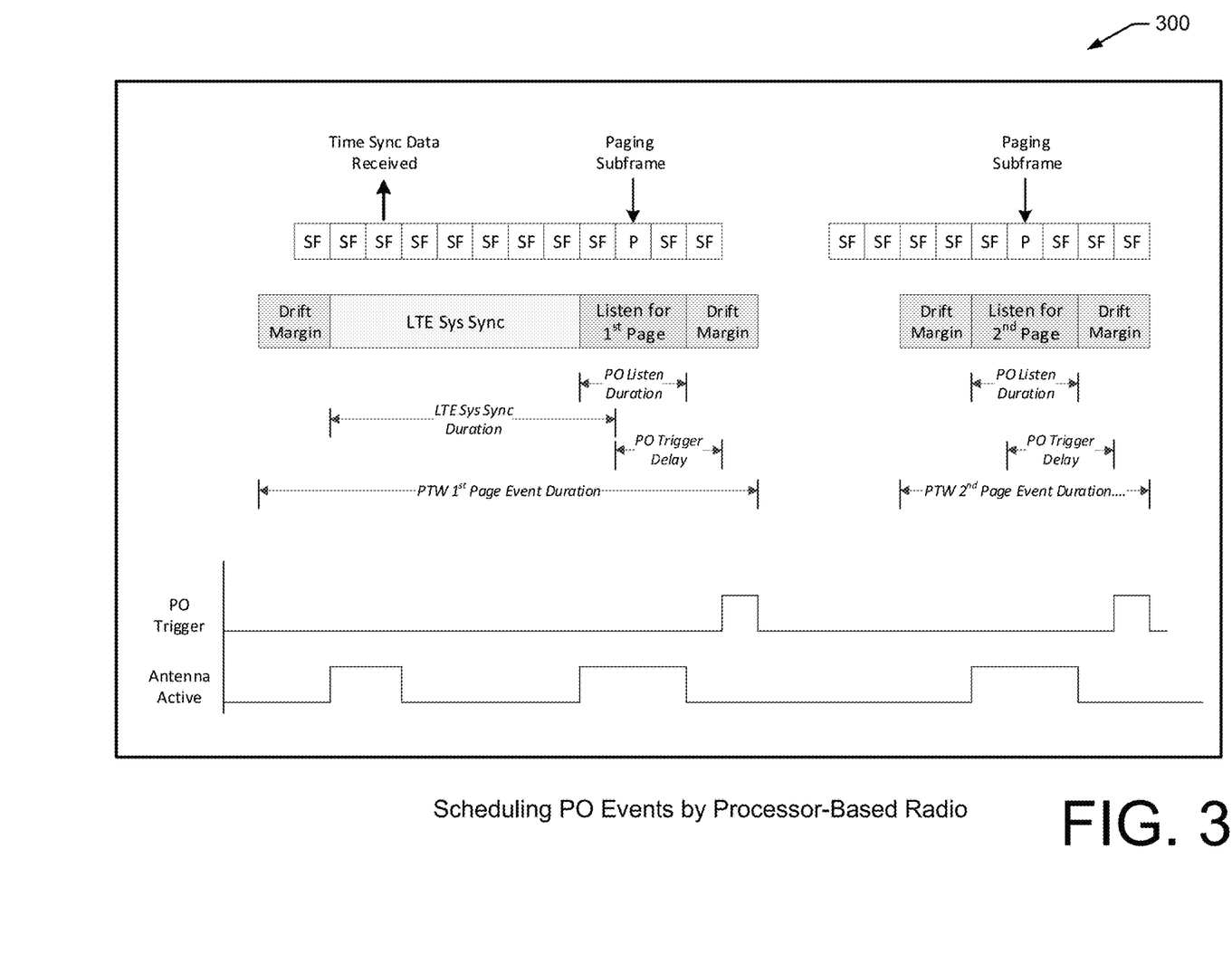
FIG. 3 is an example timing diagram showing scheduling paging opportunity (PO) events by a processor-based radio.

Discussion of FIG. 3

The processor-based radio may use the scheduling information received in the eDRx scheduling indication from the LTE modem and the LTE Timing Ref signal to identify when the 1st PO of the next PTW will occur. This is done by using the Time to 1st PO received in the indication and the timestamp of the LTE Timing Ref captured by the processor-based radio to calculate when the leading edge of the 1st PO of the next eDRx PTW will occur. The processor-based radio creates detailed scheduling 300 events for each upcoming PO as shown in FIG. 3 and communicates these events to the event arbitrator.

The processor-based radio may apply an appropriate drift margin to account for real-time clock (RTC) drift (e.g., uncertainty-of-exact-time) on the front and back end of each event it schedules. For the example shown in FIG. 3, the processor-based radio will first calculate the start point of the LTE Sys Sync by subtracting LTE Sys Sync Duration time from the leading edge of the 1st PO subframe specified in the eDRx scheduling indication received from the LTE modem. It will then apply additional Drift Margin to determine when the event for the 1st PO may start as shown in FIG. 3. It will then use the PO Listen Duration received in the eDRx scheduling indication and calculate the time past the leading edge of the 1st PO. The calculation may be made by dividing the time by a factor of 2 and adding 0.5 ms or ½ of the PO subframe. The calculation may consider that the trigger occurs at the leading edge of the PO subframe. The calculation may result in a time the LTE modem expects to finish listening for a PO. Drift Margin may then be added to that time to arrive at an end point for the PO event. Once these two times are known the processor-based radio can then create an arbitrator event for the 1st PO.

Before scheduling the second PO event, the processor-based radio may wait for the first PO to occur. When this occurs the processor-based radio may timestamp the time the PO Trigger GPIO signal goes active. Once the PO occurs it may use the PO Trigger GPIO and the PO Trigger Delay received in the eDRx scheduling indication to determine an exact time the PO occurred with respect to the processor-based radio RTC. This is done by subtracting the PO Trigger Delay from the timestamp capture from the PO Trigger GPIO signal.

The processor-based radio may then use this exact time to calculate when the next PO will occur using the Time Between PO(s) received in the eDRx scheduling indication from the LTE modem. The same processes used to calculate the start time and end time of the event can be used again for the 2nd PO. In the example of FIG. 3, the LTE modem has specified that no LTE Sys Sync Duration is required for the second PO so the processor-based radio may use the PO Listen Duration to calculate both the starting point and ending point of the desired listen window for the PO and apply the Drift Margin to both sides to arrive at the overall starting point, ending point, and duration of the PTW 2nd PO. The processor-based radio may then create an event to schedule with the arbitrator for the 2nd PO of the PTW.

Once the 2nd PO occurs, the processor-based radio may then use the precise time capture for the 1st PO via the PO Trigger GPIO and PO Trigger Delay in conjunction with the Duration of eDRx cycle received in the eDRx scheduling information received from the LTE modem to identify the 1st PO of the next PTW window. Once identified the same method for calculating the PO events as described above can be reused in the next eDRX cycle.

Processor-Based Radio Shared Resource Management

The processor-based radio may use the PO events it created for the LTE modem eDRx PTW in conjunction with the GPIO signals to coordinate the usage of shared resources between the LTE modem and the processor-based radio. If a conflict between the LTE modem and the processor-based radio occurs, a priority-based set of decision criteria may be used to identify which radio will receive use of the shared resources. The priority-based set of decision criteria may be configured within the arbiter of shared resource use 126 of FIG. 1.

Example Methods

Figure 4A:
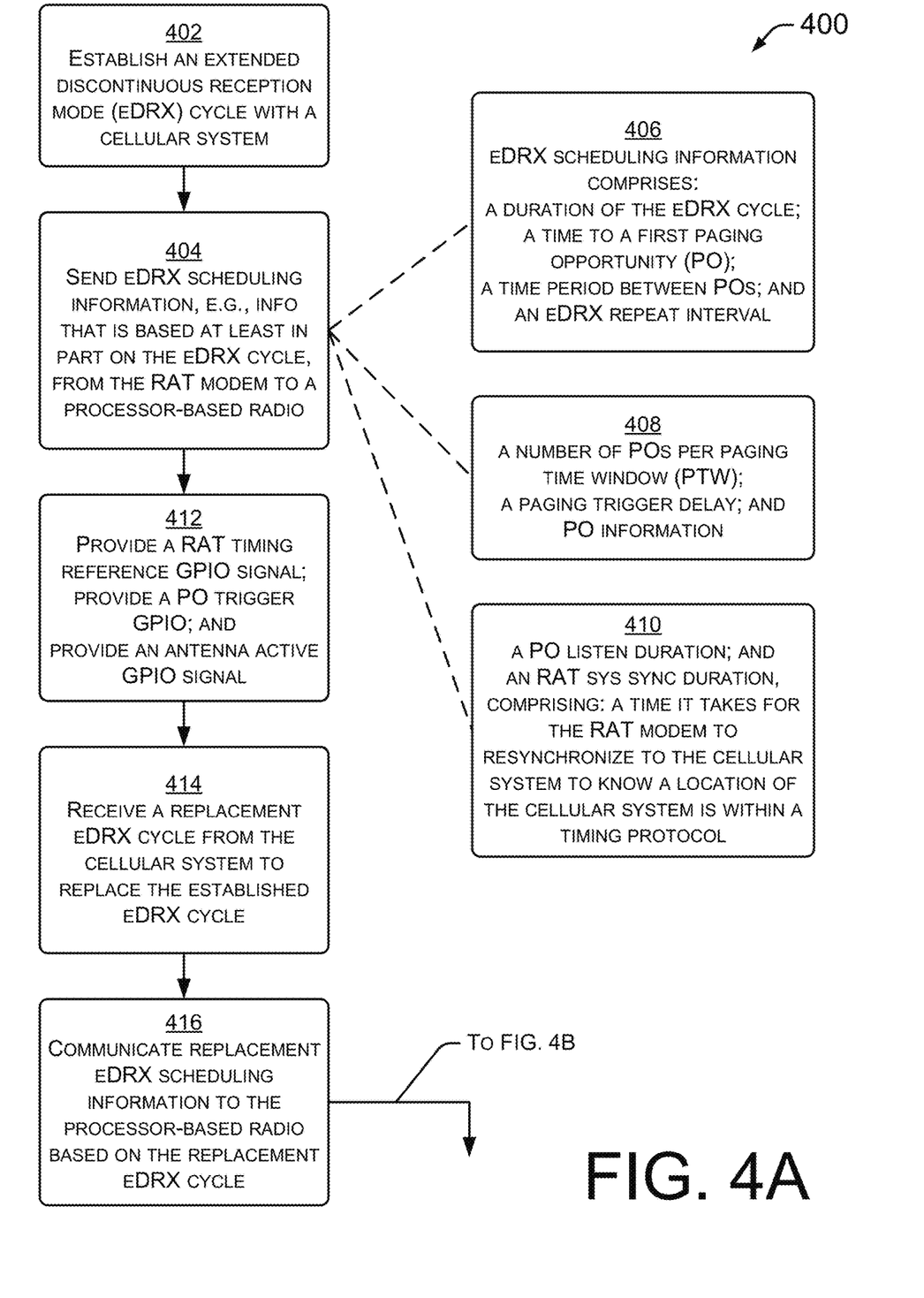
FIGS. 4A and 4B are flow diagrams describing example operation of an RAT modem within a multiple radio system.
Figure 4B:
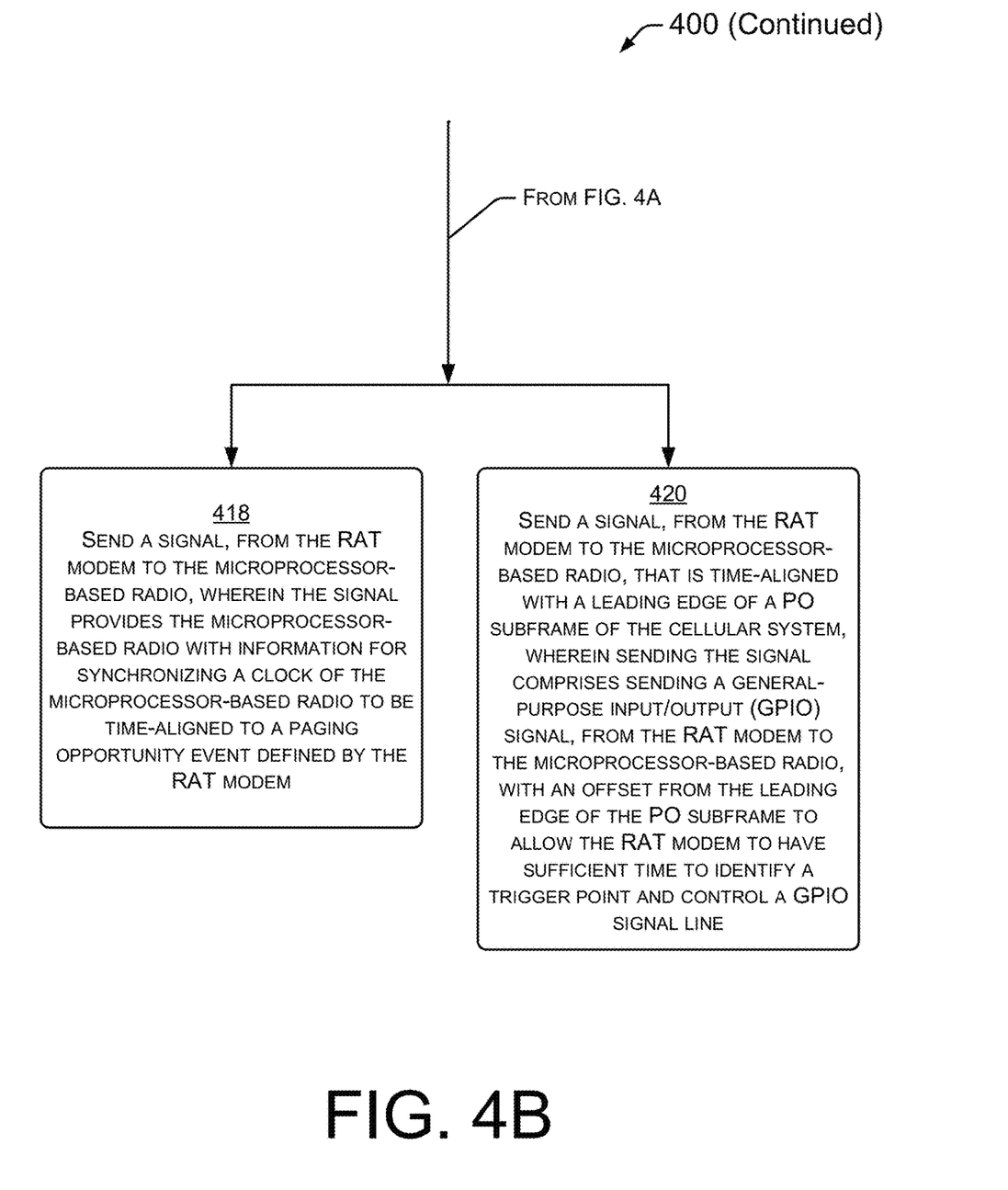

FIG. 4 shows example operation 400 of an RAT modem (e.g., an LTE modem) within a multiple radio system. In the example, the RAT modem performs aspects of eDRX paging opportunity management and shares resources with another radio. At block 402, an extended discontinuous reception mode (eDRX) cycle is established with a cellular system. In the example of FIG. 1, the RAT or LTE modem 120 establishes an eDRX cycle with the cellular system 108.

At block 404, the RAT modem or device sends eDRX scheduling information, e.g., info that is based at least in part on the eDRX cycle, from the RAT device to a processor-based radio. In the example of FIG. 1, the RAT modem 120 sends a message 124 (e.g., using GPIO signals and/or data on a data bus or wiring) containing scheduling information to the processor-based radio 122. Blocks 406, 408, 410 describe example information that the RAT modem may send. The information of each block may be sent fully or partly, and the information of one or more blocks may be sent, singly and/or in combination. At block 406, eDRX scheduling information may include: a duration of the eDRX cycle; a time to a first paging opportunity (PO); a time period between POs; and an eDRX repeat interval. At block 408, the information may include: a number of POs per paging time window (PTW); a PO Trigger Delay; and/or other PO information. At block 410, the information may include: a PO listen duration; and/or an RAT sys sync duration, comprising: a time it takes for the RAT modem to resynchronize to the cellular system to know a location of the cellular system is within a timing protocol.

At block 412, the RAT modem may provide signals to the processor-based radio. In examples, the RAT modem provides: a timing reference GPIO signal; a PO trigger GPIO; and/or an antenna active GPIO signal.

At blocks 414 and 416, the RAT (e.g., LTE) modem receives a replacement eDRX cycle, resulting in new scheduling information. This should be coordinated with the processor-based radio. At block 414, a replacement eDRX cycle is received by the LTE modem from the cellular system to replace the established eDRX cycle. In the example of FIG. 1, the modem 120 receives a new eDRX cycle from the cellular system 108. At block 416, the replacement eDRX scheduling information is communicated to the processor-based radio based on the replacement eDRX cycle. In the example of FIG. 1, the processor-based radio 122 may receive the information as a message 124 from the RAT or LTE modem 120. The processor-based radio may utilize the information as described above and/or as described with reference to FIGS. 5 and/or 6.

Blocks 418 and 420 describe the transmission of the information from the RAT/LTE modem using different levels of detail and/or different perspectives. At block 418, a signal is sent, from the RAT modem to the processor-based radio. In an example, the signal provides the processor-based radio with information for synchronizing a clock of the processor-based radio to be time-aligned to a paging opportunity event defined by the RAT modem.

At block 420, a signal is sent, from the RAT modem to the processor-based radio. The signal is time-aligned with a leading edge of a PO subframe of the cellular system. In an example, the signal is a general-purpose input/output (GPIO) signal, sent from the RAT modem to the processor-based radio. In a further example, the signal is offset from the leading edge of the PO subframe to allow the RAT modem to have sufficient time to identify a trigger point and control a GPIO signal line.

Figure 5A:
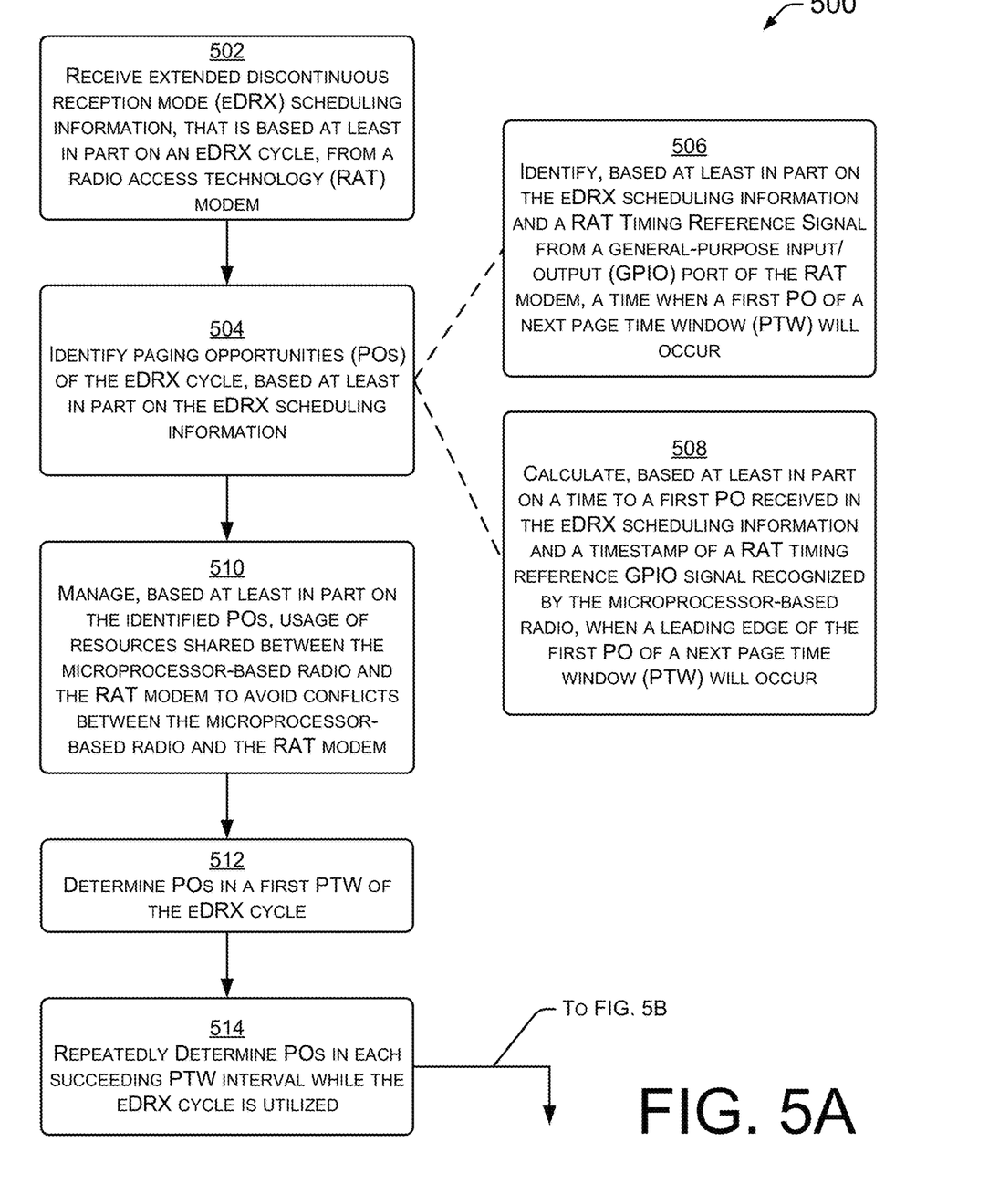
FIGS. 5A and 5B are flow diagrams describing example operation of a processor-based radio within a multiple radio system.
Figure 5B:
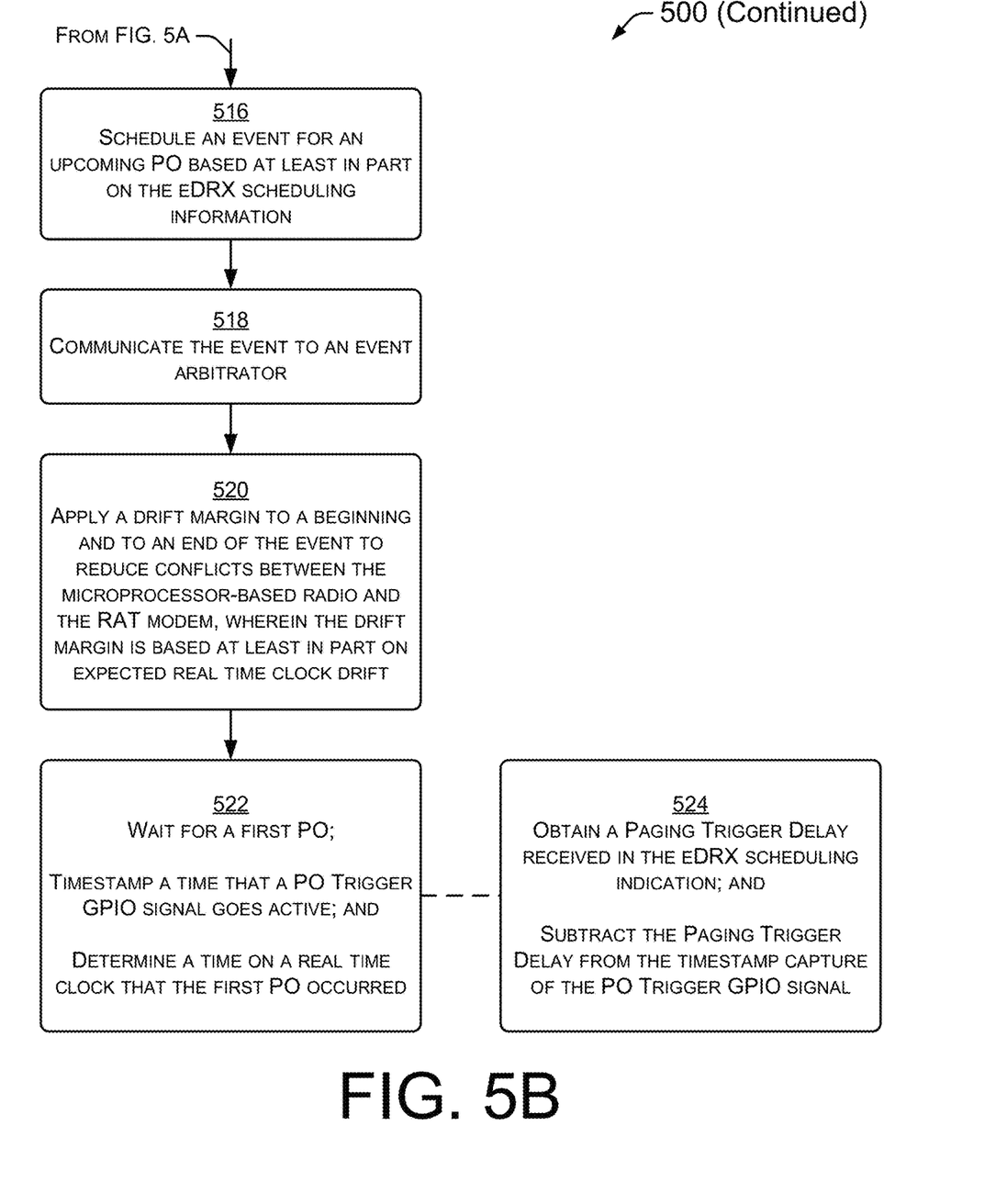

FIG. 5 shows example operation 500 of processor-based radio within a multiple radio system. In the example, a processor-based radio performs aspects of eDRx paging opportunity management. The processor-based radio receives, e.g., from an RAT modem, information about an eDRx cycle. The processor-based radio creates a series of event schedules relative to the eDRx cycle. The processor-based radio receives a triggering signal from the modem. The processor-based radio uses the triggering signal to establish timing of future eDRx events. The processor-based radio arbitrates, based on the future eDRx events, use of the shared resources.

At block 502, extended discontinuous reception mode (eDRX) scheduling information is received at the processor-based radio from a radio access technology (RAT) modem. The information is based at least in part on an eDRX cycle. The cycle may be a new (first) cycle or a replacement cycle.

At block 504, the processor-based radio identifies paging opportunities (POs) of the eDRX cycle, based at least in part on the eDRX scheduling information. Blocks 506 and 508 present example techniques to identify the POs of the eDRX cycle. At block 506, the processor-based radio identifies-based at least in part on the eDRX scheduling information and an RAT Timing Reference Signal from a general-purpose input/output (GPIO) port of the RAT modem—a time when a first PO of a next page time window (PTW) will occur. At block 508, the processor-based radio calculates-based at least in part on a time to a first PO received in the eDRX scheduling information and a timestamp of an RAT timing reference GPIO signal recognized by the processor-based radio—when a leading edge of the first PO of a next page timing window (PTW) will occur.

At block 510, the processor-based radio manages—based at least in part on the identified POs—usage of resources shared between the processor-based radio and the RAT modem to avoid conflicts between the processor-based radio and the RAT modem. In an example, the management may assign certain resources to the RAT modem and/or certain resources to the processor-based radio.

Blocks 512 and 514 describe aspects of how the processor-based radio repeatedly performs calculations, thereby lessening a workload of the RAT/LTE modem and assisting in the sharing of resources. At block 512, the processor-based radio determines POs in a first PTW of the eDRX cycle. And at block 514, the processor-based radio repeatedly determines POs in each succeeding PTW interval while the eDRX cycle is utilized.

At block 516, the processor-based radio may schedule an event for an upcoming PO based at least in part on the eDRX scheduling information. In an example, the event may require resources, such as use of an antenna.

At block 518, the event is communicated to an event arbitrator. Referring to the example of FIG. 1, the processor-based radio 122 may communicate the event and need for use of shared resources to the arbiter of shared resource use 126. The arbiter makes sure that the shared resource is available to support the event of block 516, and reserves it for use by the appropriate device.

Blocks 520 through 524 describe example techniques to handle the timing of events and/or actions and paging opportunities (POs). In the example of block 520, a drift margin may be applied to a beginning and/or to an end of the event to reduce conflicts based between the processor-based radio and the RAT modem, wherein the drift margin is based at least in part on expected real time clock drift. In the example of block 522, the processor-based radio waits for a first PO. The processor-based radio timestamps a time that a PO Trigger GPIO signal (e.g., a GPIO signal sent by the RAT modem) goes active. The processor-based radio determines a time on a real time clock that the first PO occurred. Block 524 provides example techniques describing an example of how the processor-based radio determines the time on the real time clock of block 522. At block 524, the processor-based radio obtains a value of a PO Trigger Delay, as received in the eDRX scheduling information. The processor-based radio then subtracts the PO Trigger Delay from the timestamp capture of the PO Trigger GPIO signal.

Figure 6:
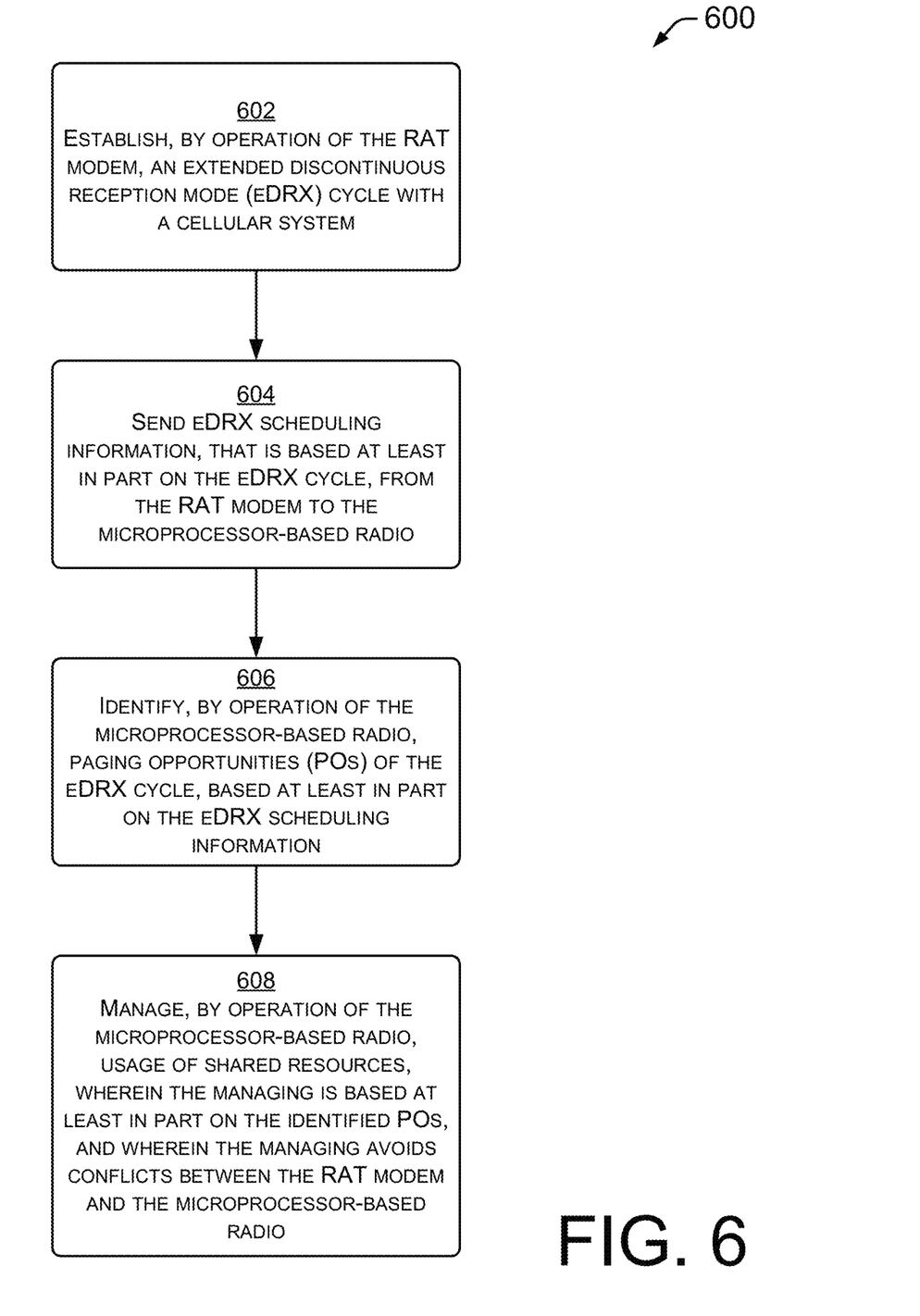
FIG. 6 is a flow diagram describing example operation of a multi-radio system and/or network node.

FIG. 6 shows example operation 600 of a multi-radio system and/or network node. The example system 600 performs aspects of eDRx paging opportunity management and efficient shared resource utilization. In an example method or operation, techniques facilitate the sharing of resources between a modem and a processor-based radio. In different examples, the modem may be a cellular modem, a long-term evolution (LTE) modem, an RAT modem, or alternative modem-like device and/or technology.

At block 602, operation of an RAT modem establishes an extended discontinuous reception mode (eDRX) cycle with a cellular system. In the example of FIG. 1, the modem 120 establishes the eDRX cycle with the cellular system 108.

At block 604, the RAT modem sends eDRX scheduling information, that is based at least in part on the eDRX cycle, from the RAT modem to the processor-based radio. In the example of FIG. 1, the communications link 125 enables the modem to send the eDRX scheduling information.

At block 606, operation of the processor-based radio identifies paging opportunities (POs) of the eDRX cycle, based at least in part on the eDRX scheduling information received from the RAT modem.

At block 608, the processor-based radio manages usage of resources shared between the processor-based radio and the RAT modem. In an example, the managing is based at least in part on the identified POs (e.g., a resource that would exclusively be used by one device during the PO). Accordingly, the managing avoids conflicts between the RAT modem and the processor-based radio.

Example Systems and Devices

The following examples of LTE Modem eDRx Paging Opportunity Management are expressed as number clauses. While the examples illustrate a number of possible configurations and techniques, they are not meant to be an exhaustive listing of the systems, methods, radios, modems, technologies, and/or techniques described herein.

1. A radio access technology (RAT) modem, comprising: a radio device; an antenna, connected to the radio device; one or more processors to control operation of the radio device; one or more computer-readable media, comprising computer-executable instructions, that when executed by the one or more processors, configure the RAT modem to perform acts comprising: establishing an extended discontinuous reception mode (eDRX) cycle with a cellular system; and sending eDRX scheduling information, that is based at least in part on the eDRX cycle, from the RAT modem to a processor-based radio, wherein sending the eDRX scheduling information comprises sending information comprising: a duration of the eDRX cycle; a time to a first paging opportunity (PO); a time period between POs; and an eDRX repeat interval.

2. The RAT modem of clause 1, wherein the eDRX scheduling information additionally comprises: a number of POs per paging time window (PTW); a PO Trigger Delay; and PO information, comprising: a PO listen duration; and an RAT sys sync duration, comprising: a time it takes for the RAT modem to resynchronize to the cellular system to know a location of the cellular system is within a timing protocol.

3. The RAT modem of clause 1, wherein the acts additionally comprise: receiving a replacement eDRX cycle from the cellular system to replace the established eDRX cycle; and communicating replacement eDRX scheduling information to the processor-based radio based on the replacement eDRX cycle.

4. The RAT modem of clause 1, wherein the acts additionally comprise: providing an RAT timing reference GPIO signal; providing a PO trigger GPIO; and providing an antenna active GPIO signal.

5. The RAT modem of clause 1, wherein the acts additionally comprise: sending a signal, from the RAT modem to the processor-based radio, that is time-aligned with a leading edge of a PO subframe of the cellular system, wherein sending the signal comprises sending a general-purpose input/output (GPIO) signal, from the RAT modem to the processor-based radio, with an offset from the leading edge of the PO subframe to allow the RAT modem to have sufficient time to identify a trigger point and control a GPIO signal line.

6. The RAT modem of clause 1, wherein the acts additionally comprise: sending a signal, from the RAT modem to the processor-based radio, wherein the signal provides the processor-based radio with information for synchronizing a clock of the processor-based radio to be time-aligned to a paging opportunity event defined by the RAT modem.

The RAT modem of clause 1, additionally comprising any or all of the preceding clauses.

7. One or more computer-readable media storing computer-executable instructions that, when executed by one or more processors, configure a radio access technology (RAT)

modem to perform acts comprising: establishing an extended discontinuous reception mode (eDRX) cycle with a cellular system; and sending eDRX scheduling information, that is based at least in part on the eDRX cycle, from the RAT modem to a processor-based radio, wherein sending the eDRX scheduling information comprises sending information comprising: a duration of the eDRX cycle; a time to a first paging opportunity (PO); a time period between POs; and an eDRX repeat interval.

8. The one or more computer-readable media of clause 7, wherein the eDRX scheduling information additionally comprises: a number of POs per paging time window (PTW); a PO Trigger Delay; and PO information, comprising: a PO listen duration; and an RAT sys sync duration, comprising: a time it takes for the RAT modem to resynchronize to the cellular system to know a location of the cellular system is within a timing protocol.

9. The one or more computer-readable media of clause 7, wherein the acts additionally comprise: receiving a replacement eDRX cycle from the cellular system to replace the established eDRX cycle; and communicating replacement eDRX scheduling information to the processor-based radio based on the replacement eDRX cycle.

10. The one or more computer-readable media of clause 7, wherein the acts additionally comprise: providing an RAT timing reference GPIO signal; providing a PO trigger GPIO; and providing an antenna active GPIO signal.

11. The one or more computer-readable media of clause 7, wherein the acts additionally comprise: sending a signal, from the RAT modem to the processor-based radio, that is time-aligned with a leading edge of a PO subframe of the cellular system, wherein sending the signal comprises sending a general-purpose input/output (GPIO) signal, from the RAT modem to the processor-based radio, with an offset from the leading edge of the PO subframe to allow the RAT modem to have sufficient time to identify a trigger point and control a GPIO signal line.

12. The one or more computer-readable media of clause 7, wherein the acts additionally comprise: sending a signal, from the RAT modem to the processor-based radio, wherein the signal provides the processor-based radio with information for synchronizing a clock of the processor-based radio to be time-aligned to a paging opportunity event defined by the RAT modem.

The one or more computer-readable media of clause 7, additionally comprising any or all of the preceding clauses.

13. A method to share resources between a radio access technology (RAT) modem and a processor-based radio, comprising: establishing, by operation of the RAT modem, an extended discontinuous reception mode (eDRX) cycle with a cellular system; sending eDRX scheduling information, that is based at least in part on the eDRX cycle, from the RAT modem to the processor-based radio; identifying, by operation of the processor-based radio, paging opportunities (POs) of the eDRX cycle, based at least in part on the eDRX scheduling information; and managing, by operation of the processor-based radio, usage of shared resources, wherein the managing is based at least in part on the identified POs, and wherein the managing avoids conflicts between the RAT modem and the processor-based radio.

14. The method of clause 13, wherein the eDRX scheduling information comprises: a duration of the eDRX cycle; a time to a first PO; a time period between POs; and an eDRX repeat interval.

15. The method of clause 13, additionally comprising: sending a signal, from the RAT modem to the processor-based radio, that is time-aligned with a leading edge of a PO subframe of the cellular system.

16. The method of clause 15, wherein sending the signal comprises: sending a general-purpose input/output (GPIO) signal, from the RAT modem to the processor-based radio, with an offset from the leading edge of the PO subframe to allow the RAT modem to have sufficient time to identify a trigger point and control a GPIO signal line.

17. The method of clause 13, additionally comprising: receiving, by operation of the processor-based radio, a signal from the RAT modem; and synchronizing, by operation of the processor-based radio using the signal, a clock of the processor-based radio to be time-aligned to a paging opportunity event defined by the RAT modem.

18. The method of clause 13, additionally comprising: determining POs in a first page timing window (PTW) of the eDRX cycle; and repeatedly determining POs in each succeeding PTW interval while the eDRX cycle is utilized.

19. The method of clause 13, additionally comprising: sending a GPIO signal, from the RAT modem to the processor-based radio, to indicate that the RAT modem requires use of the shared resources, including an antenna port, to receive or transmit signals.

20. The method of clause 13, wherein the shared resources comprise: one or more antennas; transmit and receive amplifiers; digital signal processing (DSP) elements; memory; and elements of a physical layer.

The method of clause 13, additionally comprising any or all of the preceding clauses.

21. A method of operating a processor-based radio, comprising: receiving extended discontinuous reception mode (eDRX) scheduling information, that is based at least in part on an eDRX cycle, from a radio access technology (RAT) modem; identifying paging opportunities (POs) of the eDRX cycle, based at least in part on the eDRX scheduling information; and managing, based at least in part on the identified POs, usage of resources shared between the processor-based radio and the RAT modem to avoid conflicts between the processor-based radio and the RAT modem.

22. The method of clause 21, additionally comprising: determining POs in a first page time window PTW of the eDRX cycle; and repeatedly determining POs in each succeeding PTW interval while the eDRX cycle is utilized.

23. The method of clause 21, wherein identifying POs of the eDRX cycle comprises: identifying, based at least in part on the eDRX scheduling information and an RAT Timing Reference Signal from a general-purpose input/output (GPIO) port of the RAT modem, a time when a first PO of a next page time window (PTW) will occur.

24. The method of clause 21, wherein identifying POs of the eDRX cycle comprises: calculating, based at least in part on a time to a first PO received in the eDRX scheduling information and a timestamp of an RAT timing reference GPIO signal recognized by the processor-based radio, when a leading edge of the first PO of a next page time window (PTW) will occur.

25. The method of clause 21, additionally comprising: scheduling an event for an upcoming PO based at least in part on the eDRX scheduling information; and communicating the event to an event arbitrator.

26. The method of clause 25, wherein scheduling the event for the upcoming PO comprises: applying a drift margin to a beginning and to an end of the event to reduce conflicts between the processor-based radio and the RAT modem, wherein the drift margin is based at least in part on expected real time clock drift.

27. The method of clause 21, additionally comprising: waiting for a first PO; timestamping a time that a PO Trigger GPIO signal goes active; determining a time on a real time clock that the first PO occurred, wherein the determining comprises: obtaining a PO Trigger Delay received in the eDRX scheduling information; and subtracting the PO Trigger Delay from the timestamp capture of the PO Trigger GPIO signal.

28. The method of clause 21, wherein: the RAT modem is an LTE modem; and the shared resources comprise: one or more antennas; transmit and receive amplifiers; DSP processing elements; memory elements; and elements of a physical layer.

The method of clause 21, additionally comprising any or all of the preceding clauses.

29. One or more computer-readable media storing computer-executable instructions that, when executed by one or more processors, configure a processor-based radio to perform acts comprising: receiving extended discontinuous reception mode (eDRX) scheduling information, that is based at least in part on an eDRX cycle, from a radio access technology (RAT) modem; identifying paging opportunities (POs) of the eDRX cycle, based at least in part on the eDRX scheduling information; and managing, based at least in part on the identified POs, usage of resources shared between the processor-based radio and the RAT modem to avoid conflicts between the processor-based radio and the RAT modem.

30. The one or more computer-readable media of clause 29, wherein the acts additionally comprise: determining POs in a first page time window (PTW) of the eDRX cycle; and repeatedly determining POs in each succeeding PTW interval while the eDRX cycle is utilized.

31. The one or more computer-readable media of clause 29, wherein acts identifying POs of the eDRX cycle comprise: identifying, based at least in part on the eDRX scheduling information and an RAT Timing Reference Signal from a general-purpose input/output (GPIO) port of the RAT modem, a time when a first PO of a next page time window (PTW) will occur.

32. The one or more computer-readable media of clause 29, wherein acts identifying POs of the eDRX cycle comprise: calculating, based at least in part on a time to a first PO received in the eDRX scheduling information and a timestamp of an RAT timing reference GPIO signal recognized by the processor-based radio, when a leading edge of the first PO of a next page time window (PTW) will occur.

33. The one or more computer-readable media of clause 29, wherein the acts additionally comprise: scheduling an event for an upcoming PO based at least in part on the eDRX scheduling information; and communicating the event to an event arbitrator.

34. The one or more computer-readable media of clause 33, wherein scheduling the event for the upcoming PO comprises: applying a drift margin to a beginning and to an end of the event to reduce conflicts between the processor-based radio and the RAT modem, wherein the drift margin is based at least in part on expected real time clock drift.

35. The one or more computer-readable media of clause 29, wherein the acts additionally comprise: waiting for a first PO; timestamping a time that a PO Trigger GPIO signal goes active; determining a time on a real time clock that the first PO occurred, wherein the determining comprises: obtaining a PO Trigger Delay received in the eDRX scheduling information; and subtracting the PO Trigger Delay from the timestamp capture of the PO Trigger GPIO signal.

36. The one or more computer-readable media of clause 29, wherein: the RAT modem is an LTE modem; and the shared resources comprise: one or more antennas; transmit and receive amplifiers; DSP processing elements; memory elements; and elements of a physical layer.

The one or more computer-readable media of clause 29, additionally comprising any or all of the preceding clauses.

37. A system, comprising: a radio access technology (RAT) modem, configured to perform acts comprising: establishing an extended discontinuous reception mode (eDRX) cycle with a cellular system; and sending eDRX scheduling information, that is based at least in part on the eDRX cycle, wherein the eDRX scheduling information comprises: a duration of the eDRX cycle; a time to a first PO; a time period between POs; and an eDRX repeat interval; and a processor-based radio, configured to perform acts comprising: receiving the eDRX scheduling information sent by the RAT modem; identifying, by operation of the processor-based radio, paging opportunities (POs) of the eDRX cycle, based at least in part on the eDRX scheduling information; and managing, by operation of the processor-based radio, usage of resources shared between the RAT modem and the processor-based radio.

38. The system of clause 37, wherein the RAT modem is additionally configured to perform acts comprising: sending a signal, from the RAT modem to the processor-based radio, that is time-aligned with a leading edge of a PO subframe of the cellular system.

39. The system of clause 37, wherein the processor-based radio is additionally configured to perform acts comprising: receiving, by operation of the processor-based radio, a signal from the RAT modem; and synchronizing, by operation of the processor-based radio using the signal, a clock of the processor-based radio to be time-aligned to a paging opportunity event defined by the RAT modem.

20. The system of clause 17, wherein the processor-based radio is additionally configured to perform acts comprising: determining POs in a first page time window (PTW) of the eDRX cycle; and repeatedly determining POs in each succeeding PTW interval while the eDRX cycle is utilized.

The system of clause 17, additionally comprising any or all of the preceding clauses.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A radio access technology (RAT) modem, comprising:
a radio device;
an antenna, connected to the radio device;
one or more processors to control operation of the radio device;
one or more computer-readable media, comprising computer-executable instructions, that when executed by the one or more processors, configure the RAT modem to perform acts comprising:
 establishing an extended discontinuous reception mode (eDRX) cycle with a cellular system; and
 sending eDRX scheduling information, that is based at least in part on the eDRX cycle, from the RAT modem to a processor-based radio, wherein sending the eDRX scheduling information comprises sending information comprising:

a duration of the eDRX cycle;
a time to a first paging opportunity (PO);
a time period between POs; and
an eDRX repeat interval;
wherein sending the eDRX scheduling information comprises sending a signal, from the RAT modem to the processor-based radio, that is time-aligned with a leading edge of a PO subframe of the cellular system or that is time-aligned with an offset from the leading edge of the PO subframe of the cellular system.

2. The RAT modem of claim 1, wherein the eDRX scheduling information additionally comprises:
a number of POs per paging time window (PTW);
a PO Trigger Delay; and
PO information, comprising:
a PO listen duration; and
an RAT sys sync duration, comprising: a time it takes for the RAT modem to resynchronize to the cellular system to know a location of the cellular system is within a timing protocol.

3. The RAT modem of claim 1, wherein the acts additionally comprise:
receiving a replacement eDRX cycle from the cellular system to replace the established eDRX cycle; and
communicating replacement eDRX scheduling information to the processor-based radio based on the replacement eDRX cycle.

4. The RAT modem of claim 1, wherein the acts additionally comprise:
providing an RAT timing reference general-purpose input/output (GPIO) signal;
providing a PO trigger GPIO; and
providing an antenna active GPIO signal.

5. The RAT modem of claim 1, wherein the acts additionally comprise:
sending a signal, from the RAT modem to the processor-based radio, that is time-aligned with a leading edge of a PO subframe of the cellular system, wherein sending the signal comprises sending a general-purpose input/output (GPIO) signal, from the RAT modem to the processor-based radio, with an offset from the leading edge of the PO subframe to allow the RAT modem to have sufficient time to identify a trigger point and control a GPIO signal line.

6. The RAT modem of claim 1, wherein the acts additionally comprise:
sending a signal, from the RAT modem to the processor-based radio, wherein the signal provides the processor-based radio with information for synchronizing a clock of the processor-based radio to be time-aligned to a paging opportunity event defined by the RAT modem.

7. One or more computer-readable media storing computer-executable instructions that, when executed by one or more processors, configure a radio access technology (RAT) modem to perform acts comprising:
establishing an extended discontinuous reception mode (eDRX) cycle with a cellular system; and
sending eDRX scheduling information, that is based at least in part on the eDRX cycle, from the RAT modem to a processor-based radio, wherein sending the eDRX scheduling information comprises sending information comprising:
a duration of the eDRX cycle;
a time to a first paging opportunity (PO);
a time period between POs; and
an eDRX repeat interval;
wherein sending the eDRX scheduling information comprises sending a signal, from the RAT modem to the processor-based radio, that is time-aligned with a leading edge of a PO subframe of the cellular system or that is time-aligned with an offset from the leading edge of the PO subframe of the cellular system.

8. The one or more computer-readable media of claim 7, wherein the eDRX scheduling information additionally comprises:
a number of POs per paging time window (PTW);
a PO Trigger Delay; and
PO information, comprising:
a PO listen duration; and
an RAT sys sync duration, comprising: a time it takes for the RAT modem to resynchronize to the cellular system to know a location of the cellular system is within a timing protocol.

9. The one or more computer-readable media of claim 7, wherein the acts additionally comprise:
receiving a replacement eDRX cycle from the cellular system to replace the established eDRX cycle; and
communicating replacement eDRX scheduling information to the processor-based radio based on the replacement eDRX cycle.

10. The one or more computer-readable media of claim 7, wherein the acts additionally comprise:
providing an RAT timing reference general-purpose input/output (GPIO) signal;
providing a PO trigger GPIO; and
providing an antenna active GPIO signal.

11. The one or more computer-readable media of claim 7, wherein the acts additionally comprise:
sending a signal, from the RAT modem to the processor-based radio, that is time-aligned with a leading edge of a PO subframe of the cellular system, wherein sending the signal comprises sending a general-purpose input/output (GPIO) signal, from the RAT modem to the processor-based radio, with an offset from the leading edge of the PO subframe to allow the RAT modem to have sufficient time to identify a trigger point and control a GPIO signal line.

12. The one or more computer-readable media of claim 7, wherein the acts additionally comprise:
sending a signal, from the RAT modem to the processor-based radio, wherein the signal provides the processor-based radio with information for synchronizing a clock of the processor-based radio to be time-aligned to a paging opportunity event defined by the RAT modem.

13. A method to share resources between a radio access technology (RAT) modem and a processor-based radio, comprising:
establishing, by operation of the RAT modem, an extended discontinuous reception mode (eDRX) cycle with a cellular system;
sending eDRX scheduling information, that is based at least in part on the eDRX cycle, from the RAT modem to the processor-based radio;
identifying, by operation of the processor-based radio, paging opportunities (POs) of the eDRX cycle, based at least in part on the eDRX scheduling information;
managing, by operation of the processor-based radio, usage of shared resources, wherein the managing is based at least in part on the identified POs, and wherein the managing avoids conflicts between the RAT modem and the processor-based radio; and sending a signal, from the RAT modem to the processor-based radio, that is time-aligned with a leading edge of a PO subframe of the cellular system.

14. The method of claim 13, wherein the eDRX scheduling information comprises:
   a duration of the eDRX cycle;
   a time to a first PO;
   a time period between POs; and
   an eDRX repeat interval.

15. The method of claim 13, wherein sending the signal comprises:
   sending a general-purpose input/output (GPIO) signal, from the RAT modem to the processor-based radio, with an offset from the leading edge of the PO subframe to allow the RAT modem to have sufficient time to identify a trigger point and control a GPIO signal line.

16. The method of claim 13, additionally comprising:
   receiving, by operation of the processor-based radio, a signal from the RAT modem; and
   synchronizing, by operation of the processor-based radio using the signal, a clock of the processor-based radio to be time-aligned to a paging opportunity event defined by the RAT modem.

17. The method of claim 13, additionally comprising:
   determining POs in a first page timing window (PTW) of the eDRX cycle; and
   repeatedly determining POs in each succeeding PTW interval while the eDRX cycle is utilized.

18. The method of claim 13, additionally comprising:
   sending a general-purpose input/output (GPIO) signal, from the RAT modem to the processor-based radio, to indicate that the RAT modem requires use of the shared resources, including an antenna port, to receive or transmit signals.

19. The method of claim 13, wherein the shared resources comprise:
   one or more antennas;
   transmit and receive amplifiers;
   digital signal processing (DSP) elements;
   memory; and
   elements of a physical layer.

20. A radio access technology (RAT) modem, comprising:
   a radio device;
   an antenna, connected to the radio device;
   one or more processors to control operation of the radio device; and
   one or more computer-readable media, comprising computer-executable instructions, that when executed by the one or more processors, configure the RAT modem to perform acts comprising:
      establishing an extended discontinuous reception mode (eDRX) cycle with a cellular system; and
      sending eDRX scheduling information, that is based at least in part on the eDRX cycle, from the RAT modem to a processor-based radio, wherein sending the eDRX scheduling information comprises sending information comprising:
         a duration of the eDRX cycle;
         a time to a first paging opportunity (PO);
         a time period between POs;
         an eDRX repeat interval;
         a number of POs per paging time window (PTW);
         a PO Trigger Delay; and
         PO information, comprising:
            a PO listen duration; and
            an RAT sys sync duration, comprising: a time it takes for the RAT modem to resynchronize to the cellular system to know a location of the cellular system is within a timing protocol.

21. One or more computer-readable media storing computer-executable instructions that, when executed by one or more processors, configure a radio access technology (RAT) modem to perform acts comprising:
   establishing an extended discontinuous reception mode (eDRX) cycle with a cellular system; and
   sending eDRX scheduling information, that is based at least in part on the eDRX cycle, from the RAT modem to a processor-based radio, wherein sending the eDRX scheduling information comprises sending information comprising:
      a duration of the eDRX cycle;
      a time to a first paging opportunity (PO);
      a time period between POs;
      an eDRX repeat interval;
      a number of POs per paging time window (PTW);
      a PO Trigger Delay; and
      PO information, comprising:
         a PO listen duration; and
         an RAT sys sync duration, comprising: a time it takes for the RAT modem to resynchronize to the cellular system to know a location of the cellular system is within a timing protocol.

* * * * *